(12) United States Patent
Uta et al.

(10) Patent No.: US 11,142,612 B2
(45) Date of Patent: Oct. 12, 2021

(54) MESOGEN-SILICON COMPOUND (CO)POLYMER AND THERMOPLASTIC ELASTOMER

(71) Applicant: SHIN-ETSU CHEMICAL CO., LTD., Tokyo (JP)

(72) Inventors: Akira Uta, Annaka (JP); Kumiko Hayashi, Annaka (JP); Tomoki Akiba, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 28 days.

(21) Appl. No.: 16/476,368

(22) PCT Filed: Jan. 16, 2018

(86) PCT No.: PCT/JP2018/001041
§ 371 (c)(1),
(2) Date: Jul. 8, 2019

(87) PCT Pub. No.: WO2018/147010
PCT Pub. Date: Aug. 16, 2018

(65) Prior Publication Data
US 2019/0352466 A1 Nov. 21, 2019

(30) Foreign Application Priority Data
Feb. 7, 2017 (JP) .............................. JP2017-020033

(51) Int. Cl.
*C08G 77/52* (2006.01)
*C08G 77/00* (2006.01)
*C08G 77/50* (2006.01)

(52) U.S. Cl.
CPC ............. *C08G 77/52* (2013.01); *C08G 77/50* (2013.01); *C08G 77/80* (2013.01)

(58) Field of Classification Search
CPC .................................. C08G 77/52; C08G 77/50
See application file for complete search history.

(56) References Cited

U.S. PATENT DOCUMENTS 6,072,016 A * 6/2000 Kobayashi ............. C08G 77/52
525/477

FOREIGN PATENT DOCUMENTS

| JP | 63-230768 A | 9/1988 |
|---|---|---|
| JP | 2010-253774 A | 11/2010 |
| WO | WO 2017/002489 A1 | 1/2017 |

OTHER PUBLICATIONS

International Search Report (PCT/ISA/210) issued in PCT/JP2018/001041, dated Apr. 24, 2018.
Written Opinion of the International Searching Authority (PCT/ISA/237) issued in PCT/JP2018/001041, dated Apr. 24, 2018.

* cited by examiner

*Primary Examiner* — Margaret G Moore
(74) *Attorney, Agent, or Firm* — Birch, Stewart, Kolasch & Birch, LLP

(57) ABSTRACT

Provided is a thermoplastic elastomer comprising a mesogen-silicon compound (co)polymer which is represented by formula (1) below and has a number average molecular weight of 1,000-500,000. The thermoplastic elastomer has transparency and rubber properties (rubber elasticity) and can be (repeatedly) molded thermally and reversibly, and thus can be suitably used in potting materials or various sealing materials. In formula (1), Ar represents a mesogenic group selected from among structures represented by formula (2) below, a represents an integer of 0.5-1, b represents a number of 0-0.5 (a and b respectively represent the ratio of the number of respective repeating units to the sum of all the repeating units in the molecule, and a+b=1), $R^1$ is a monovalent hydrocarbon group that does not contain a C1-8 aliphatic unsaturated bond, and $R^2$ is a hydrogen atom, $-Si(CH_3)_3$, $-Si(CH_3)_2(OH)$, $-Si(CH_3)_2(CH=CH_2)$ or $-Si(CH_3)_2(CH_2-CH=CH_2)$.

2 Claims, No Drawings

MESOGEN-SILICON COMPOUND (CO)POLYMER AND THERMOPLASTIC ELASTOMER

TECHNICAL FIELD

This invention relates to a novel mesogenic silicon compound (co)polymer and a thermoplastic elastomer comprising the mesogenic silicon compound (co)polymer.

BACKGROUND ART

Since so-called silicone resins such as dimethylsilicone rubbers based on polydimethylsiloxane (PDMS) and the like have excellent properties including heat resistance, electric insulation, weather resistance, flexibility, gas permeability, and chemical resistance, they are used in a wide variety of industrial applications. However, in order for silicone resins to develop rubber physical properties or rubber elasticity, it is generally necessary to convert silicone resins to elastomers or thermally irreversible cured rubber products by subjecting the silicone resins to three-dimensional chemical crosslinking using crosslinkers or the like, for hardening PDMS. Silicone polymers which themselves have rubber elasticity and exhibit thermoplasticity at the same time are not known heretofore.

In general, polymers having a robust skeleton in the main chain like polytetramethyl-p-silphenylenesiloxane (PTMPS) are known to be crystalline polymers having higher heat resistance and mechanical strength than PDMS and thermoplasticity as well (see Patent Document 1: JP-A 2010-253774). However, since PTMPS is extremely crystalline, it is difficult to obtain a thermoplastic elastomer having rubber physical properties therefrom.

PRIOR ART DOCUMENT

Patent Document

Patent Document 1: JP-A 2010-253774

SUMMARY OF INVENTION

Technical Problem

An object of the invention, which has been made under the above-mentioned circumstances, is to provide a novel thermoplastic mesogenic silicon compound (co)polymer which has a silicone (polysiloxane) skeleton in the main chain, exhibits transparency and rubber physical properties (rubber elasticity), and is thermally reversibly or repeatedly moldable, and a thermoplastic elastomer comprising the mesogenic silicon compound (co)polymer.

Solution to Problem

Making extensive investigations to attain the above object, the inventors have found that the outstanding problems are solved by a mesogenic silicon compound (co)polymer represented by the general formula (1), defined later, and having a number average molecular weight of 1,000 to 500,000 because the (co)polymer is transparent and has rubber physical properties (rubber elasticity), and also exhibits the nature of a thermoplastic elastomer that it is thermally reversibly or repeatedly moldable. The invention is predicated on this finding.

Since the polymer (or mesogenic silicon compound (co)polymer) exhibiting such physical properties possesses the superiority of silicone rubber and the productivity of thermoplastic resin at the same time, its application to a wide variety of fields is possible.

Accordingly, the invention provides a novel mesogenic silicon compound (co)polymer (a mesogen-silicon compound (co)polymer) and a thermoplastic elastomer comprising the mesogenic silicon compound (co)polymer, as defined below.

[1]

A mesogenic silicon compound (co)polymer represented by the general formula (1) and having a number average molecular weight of 1,000 to 500,000,

[Chem. 1]

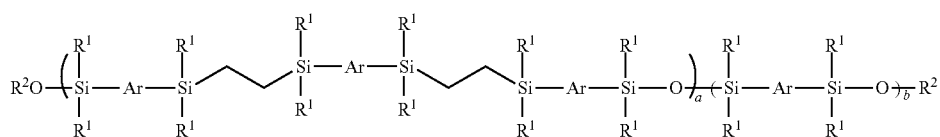

wherein Ar is a mesogenic group selected from the following structures:

[Chem. 2]

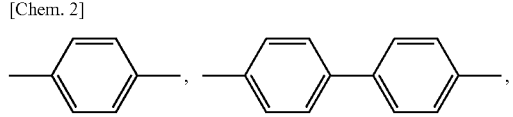

a is a positive number of 0.5 to 1, b is a number of 0 to 0.5, with the proviso that a and b represent a proportion in number of relevant repeating units to the sum of all repeating units in the molecule, respectively, and a+b=1, $R^1$ is independently a $C_1$-$C_8$ monovalent hydrocarbon group free of aliphatic unsaturation, and $R^2$ is independently hydrogen, —Si(CH$_3$)$_3$, —Si(CH$_3$)$_2$(OH), —Si(CH$_3$)$_2$(CH=CH$_2$) or —Si(CH$_3$)$_2$(CH$_2$—CH=CH$_2$).

[2]

A thermoplastic elastomer comprising the mesogenic silicon compound (co)polymer of [1], having a melting point of 50 to 250° C., and being repeatedly moldable.

Advantageous Effects of Invention

The mesogenic silicon compound (co)polymer and the thermoplastic elastomer comprising the mesogenic silicon compound (co)polymer according to the invention are highly transparent, exhibit satisfactory rubber physical properties in the service temperature range, and are repeatedly thermoplastic and effectively moldable. They are thus useful as potting materials and various sealing materials.

DESCRIPTION OF EMBODIMENTS

The invention pertains to a mesogenic silicon compound (co)polymer represented by the general formula (1) and having a number average molecular weight of 1,000 to 500,000, and a thermoplastic elastomer comprising the mesogenic silicon compound (co)polymer, having a melting point of 50 to 250° C., and being repeatedly moldable.

[Chem. 3]

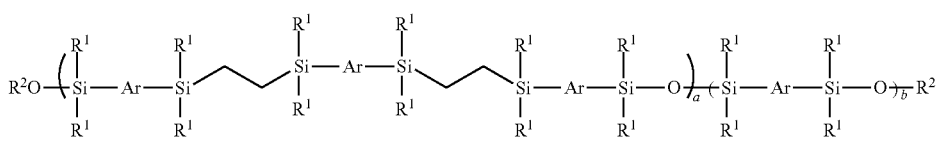

Herein Ar is a mesogenic group selected from the following structures:

[Chem. 4]

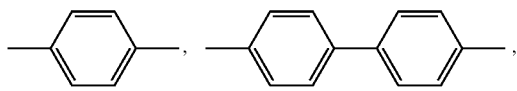

a is a positive number of 0.5 to 1, b is a number of 0 to 0.5, with the proviso that a and b represent a proportion in number of relevant repeating units to the sum of all repeating units in the molecule, respectively, and a+b=1. $R^1$ is independently a $C_1$-$C_8$ monovalent hydrocarbon group free of aliphatic unsaturation, and $R^2$ is independently hydrogen. —Si(CH$_3$)$_3$, —Si(CH$_3$)$_2$(OH), —Si(CH$_3$)$_2$(CH=CH$_2$) or —Si(CH$_3$)$_2$(CH$_2$—CH=CH$_2$).

In formula (1), $R^1$ is independently a $C_1$-$C_8$, especially $C_1$-$C_6$ monovalent hydrocarbon group free of aliphatic unsaturation, examples of which include alkyl groups such as methyl, ethyl, propyl, isopropyl, butyl, isobutyl, sec-butyl, tert-butyl, pentyl, neopentyl, hexyl and octyl, cycloalkyl groups such as cyclohexyl, and aryl groups such as phenyl, tolyl and xylyl, with methyl being preferred.

The subscript "a" is a positive number of 0.5 to 1, preferably 0.7 to 1, more preferably 0.8 to 1, "b" is a number (0 or a positive number) of 0 to 0.5, preferably 0 to 0.3, more preferably 0 to 0.2, with the proviso that a and b represent a proportion in number (i.e., molar ratio) of relevant repeating units to the sum of all repeating units in the molecule, respectively, and a+b=1.

In the mesogenic silicon compound (co)polymer, repeating units with subscript a and repeating units with subscript b are randomly arranged.

In the mesogenic silicon compound (co)polymer of formula (1), the repetition number or degree of polymerization (designated a') of silarylene-silalkylenesiloxane units [—Si(R$^1$)$_2$—Ar—Si(R$^1$)$_2$—C$_2$H$_4$—Si(R$^1$)$_2$—Ar—Si(R$^1$)$_2$—C$_2$H$_4$—Si(R$^1$)$_2$—Ar—Si(R$^1$)$_2$—O—] in the main chain is an integer of the order of 5 to 1,000, preferably 10 to 800, more preferably 30 to 500, the repetition number or degree of polymerization (designated b') of silarylenesiloxane units [—Si(R$^1$)$_2$—Ar—Si(R$^1$)$_2$—O—] in the main chain is an integer of the order of 0 to 100, preferably 0 to 80, more preferably 0 to 50, and the total number of repeating units or degree of polymerization (designated a'+b') of the overall main chain is an integer of the order of 10 to 1,000, preferably 20 to 800, more preferably 30 to 500.

The mesogenic silicon compound (co)polymer of the invention has a number average molecular weight (Mn) of 1,000 to 500,000, preferably 2,000 to 400,000, more preferably 3,000 to 300,000, as measured by gel permeation chromatography (GPC) using tetrahydrofuran as developing solvent versus polystyrene standards. If Mn is too low, the resin may be brittle and sometimes awkward to handle. If Mn is too high, the resin may show a viscosity buildup upon melting and be less effective to mold.

It is noted that number average molecular weight (Mn) or number average degree of polymerization (Nn) and weight average molecular weight (Mw) or weight average degree of polymerization (Nw) versus polystyrene standards and polydispersity index (PDI, i.e., Mw/Mn) may be measured by GPC under the conditions: column TSKgel Super H2500 (1 column) and TSKgel Super HM-N (1 column) (Tosoh Corp.), solvent tetrahydrofuran, flow rate 0.6 ml/min, RI detector (40° C.), column temperature 40° C., injection volume 50 μL, and sample concentration 0.3 wt % (the same holds true, hereinafter).

The mesogenic silicon compound (co)polymer preferably has a melting point of 50 to 250° C., more preferably 80 to 200° C. It is noted that the melting point is determined from the top of an endothermic peak upon melting as analyzed by differential scanning calorimetry (DSC) using colorimeter DSC830 by Mettler Toledo (the same holds true, hereinafter).

The mesogenic silicon compound (co)polymer of formula (1) may be prepared by the following method. First, the structural unit with subscript (repeating number) "a" in formula (1) is prepared, for example, as shown in Synthesis Example 3 later, a difunctional SiH monomer having diorganohydrogensilyl groups at both ends of a mesogenic group Ar, as represented by the following formula:

[Chem. 5]

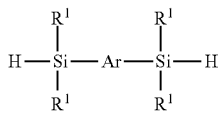

wherein $R^1$ and Ar are as defined above, and a difunctional Si-vinyl monomer having vinyldiorganosilyl groups at both ends of a mesogenic group Ar, as represented by the following formula:

[Chem. 6]

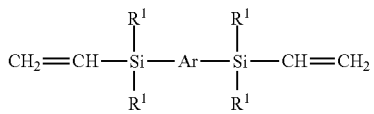

wherein $R^1$ and Ar are as defined above, are combined in such amounts that at least 2 moles of the difunctional SiH monomer may be available per mole of the difunctional Si-vinyl monomer (i.e., the molar ratio of SiH groups (hydrosilyl groups) on the difunctional SiH monomer to silicon-bonded vinyl groups on the difunctional Si-vinyl monomer is at least 2/1, the same holds true, hereinafter), preferably about 4 to 8 moles of the difunctional SiH monomer may be available per mole of the difunctional Si-vinyl monomer (i.e., in excessive molar ratio). Hydrosilylation addition reaction is carried out in the presence of a catalyst such as a platinum group metal catalyst and optionally in an organic solvent, for example, at 40 to 100° C., especially 60 to 90° C. for 6 to 48 hours, especially 8 to 24 hours, whereby a monomer (a1) capped at both ends with diorganohydrogensilyl (—Si($R^1$)$_2$(H)) groups, represented by the formula (I):

[Chem. 7]

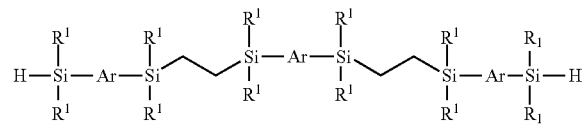

[I]

wherein $R^1$ and Ar are as defined above, is prepared. Thereafter, as shown in Synthesis Example 4 later, monomer (a1) capped with SiH groups at both ends of its molecular chain is subjected to oxidizing reaction in the presence of a catalyst such as palladium, and solvents such as deionized water and an organic solvent, for example, at 30 to 60° C., especially 40 to 50° C. for 3 to 8 hours, especially 4 to 6 hours, whereby a monomer (a2) capped at both ends with diorganohydroxysilyl (—Si($R^1$)$_2$(OH)) groups, represented by the formula (II):

[Chem. 8]

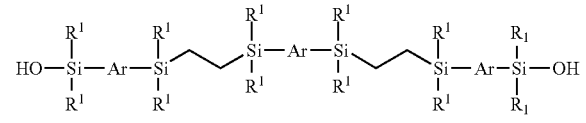

[II]

wherein $R^1$ and Ar are as defined above, is prepared.

Furthermore, as shown in Example 1 later, as the structural unit with subscript (repeating number) "a" in formula (1), for example, the monomer (a2) capped at both ends with diorganohydroxysilyl (—Si($R^1$)$_2$(OH)) groups is subjected to polycondensation reaction in the presence of a basic catalyst, for example, at 150 to 300° C., especially 180 to 250° C. for 4 to 10 hours, especially 6 to 8 hours, whereby a homopolymer having the main chain consisting of structural units with subscript (repeating number) "a" and capped with diorganohydroxysilyl (—Si($R^1$)$_2$(OH)) groups at both ends of the molecular chain (corresponding to formula (1) wherein a=1, b=0, $R^2$=H) may be prepared. Furthermore, optionally, as shown in Example 4 later, the hydroxy groups ($R^2$=H) at both ends of the molecular chain are modified with a silylating agent according to a prior art well-known method into silyl groups ($R^2$=—Si(CH$_3$)$_3$, —Si(CH$_3$)$_2$(OH), —Si(CH$_3$)$_2$(CH=CH$_2$) or —Si(CH$_3$)$_2$(CH$_2$—CH=CH$_2$)), whereby a homopolymer having the main chain consisting of structural units with subscript (repeating number) "a" and capped with silyl groups, typically triorganosilyl groups, e.g., —Si(CH$_3$)$_3$, —Si(CH$_3$)$_2$(CH=CH$_2$) or —Si(CH$_3$)$_2$(CH$_2$—CH=CH$_2$) at both ends may be prepared.

Also, as shown in Examples 2 and 3 later, for example, the monomer (a2) capped at both ends with diorganohydroxysilyl groups as the structural unit with subscript (repeating number) "a" in formula (1), and a difunctional SiOH monomer having diorganohydroxysilyl (—Si($R^1$)$_2$(OH)) groups at both ends of a mesogenic group Ar, as represented by the formula:

[Chem. 9]

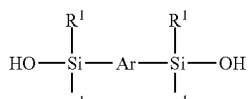

wherein $R^1$ and Ar are as defined above as the structural unit with subscript (repeating number) "b" in formula (1), as shown in Synthesis Examples 1 and 2 later, are combined in such predetermined amounts that a molar ratio of monomer (a2) to difunctional SiOH monomer may be from 9:1 to 6:4, especially from 9:1 to 7:3. Polycondensation reaction is carried out in the presence of a basic catalyst, for example, at 150 to 300° C., especially 180 to 250° C. for 4 to 10 hours, especially 6 to 8 hours, whereby a copolymer based on the main chain having randomly arranged structural units with subscript (repeating number) "a" and structural units with subscript (repeating number) "b" and capped with diorganohydroxysilyl (—Si($R^1$)$_2$(OH)) groups at both ends of the molecular chain (corresponding to formula (1) wherein a>0, b>0, a+b=1, $R^2$=H) may be prepared. Furthermore, optionally, the hydroxy groups ($R^2$—H) at both ends of the molecular chain are modified with a silylating agent according to a prior art well-known method into silyl groups ($R^2$=—Si(CH$_3$)$_3$, —Si(CH$_3$)$_2$(OH), —Si(CH$_3$)$_2$(CH=CH$_2$) or —Si(CH$_3$)$_2$(CH$_2$—CH=CH$_2$)), whereby a copolymer based on the main chain having randomly arranged structural units with subscript (repeating number) "a" and structural units with subscript (repeating number) "b" and capped with silyl groups, typically triorganosilyl groups, e.g., —Si(CH$_3$)$_3$, —Si(CH$_3$)$_2$(CH=CH$_2$) or —Si(CH$_3$)$_2$(CH$_2$—CH=CH$_2$) at both ends may be prepared.

EXAMPLES

Synthesis Examples, Examples, Use Examples, and Comparative Examples are given below for further illustrating the invention, although the invention is not limited thereto. It is noted that number average molecular weight (Mn), weight average molecular weight (Mw), and polydispersity index (PDI=Mw/Mn) are computed from measurements versus polystyrene standards by GPC under the conditions:

column TSKgel Super H2500 (1 column) and TSKgel Super HM-N (1 column) (Tosoh Corp.), solvent tetrahydrofuran, flow rate 0.6 mL/min, RI detector (40° C.), column temperature 40° C., injection volume 50 μL, and sample concentration 0.3 wt %; and the viscosity is measured at 25° C. by a rotational viscometer.

First described are Synthesis Examples of monomers from which mesogenic silicon compound (co)polymers are derived. These monomers are synthesized by the well-known method.

Synthesis Example 1

Synthesis of 1,4-bis(hydroxydimethylsilyl)benzene

A 5 L separable flask equipped with a reflux tube and 1 L dropping funnel was charged with 500 mL of tetrahydrofuran, 2,500 mL of methyl ethyl ketone, 7.8 g of 5 wt % palladium-on-carbon, and 172.8 g of deionized water, and heated at 50° C. Then, the dropping funnel was charged with 757.6 g (3.9 mol) of 1,4-bis(dimethylsilyl)benzene (trade name Silphenylene C by Shin-Etsu Chemical Co., Ltd.), which was added dropwise over 4 hours. After the completion of dropwise addition, the reaction solution was aged for 5 hours. The catalyst was removed by filtration, and the filtrate was concentrated, yielding a white solid. The solid was purified by recrystallization from a solvent mixture of 3 L of hexane and 500 mL of tetrahydrofuran, obtaining 596.9 g (2.6 mol) of 1,4-bis(hydroxydimethylsilyl)benzene (yield 68%).

$^1$H-NMR (400 MHz, CDCl$_3$) δ 7.61 (s, 4H), 1.95 (brs, 2H), 0.41 (s, 12H)

Synthesis Example 2

Synthesis of 4,4'-bis(hydroxydimethylsilyl)biphenyl

A 3 L recovery flask equipped with a reflux tube was charged with 48 g of magnesium, 1 L of dry tetrahydrofuran, and a few droplets of 1,2-dibromoethane, which were heated under reflux in nitrogen atmosphere. Then, 250 g (0.8 mol) of 4,4'-dibromobiphenyl was added to the mixture, which was heated under reflux for 1 hour to prepare a Grignard reagent. The Grignard reagent was transferred dropwise to a 3 L four-necked flask which had been charged with 170 g (1.76 mol) of dimethylchlorosilane and 200 mL of tetrahydrofuran, in an ice bath over 1 hour. After the completion of dropwise addition, reaction was run overnight at room temperature. After the residue was removed by a Kiriyama funnel, the product was purified by distillation at 140-150° C./1 mmHg, obtaining 4,4'-bis(dimethylsilyl)biphenyl.

Like the above procedure for the synthesis of 1,4-bis(hydroxydimethylsilyl)benzene aside from starting with the 4,4'-bis(dimethylsilyl)biphenyl, there was obtained 130 g (0.43 mol) of 4,4'-bis(hydroxydimethylsilyl)biphenyl (yield 47%). $^1$H-NMR (400 MHz, CDCl$_3$) δ 7.68 (d, 4H), 7.60 (d, 4H), 1.76 (brs, 2H), 0.45 (s, 12H)

Synthesis Example 3

Synthesis of Monomer 1

A 3 L separable flask equipped with a reflux tube and 500 mL dropping funnel was charged with 500 mL of toluene, 1 g of 0.5 wt % toluene solution of Karlstedt catalyst, and 1,165 g (6 mol) of 1,4-bis(dimethylsilyl)benzene (trade name Silphenylene C by Shin-Etsu Chemical Co., Ltd.), which were heated at 80° C. Then, the dropping funnel was charged with 246.5 g (1 mol) of 1,4-bis(vinyldimethylsilyl)benzene (by Shin-Etsu Chemical Co., Ltd.), which was added dropwise over 5 hours. After the completion of dropwise addition, the reaction solution was aged for 24 hours and then allowed to cool down to room temperature. Then 20 g of active carbon was added to the solution, which was stirred for 3 hours, allowing the active carbon to adsorb the residual catalyst. The active carbon was removed by filtration. The filtrate was vacuum distilled at 180° C. and 200 Pa for 4 hours to remove the solvent and unreacted 1,4-bis(dimethylsilyl)benzene, and allowed to cool down. There was obtained 587 g (yield 93%) of Monomer 1 having the formula (2) below.

$^1$H-NMR (400 MHz, CDCl$_3$) δ 7.56 (m, 12H), 3.21 (s, 2H), 1.04 (t, 8H), 0.43 (s, 36H)

[Chem. 10]

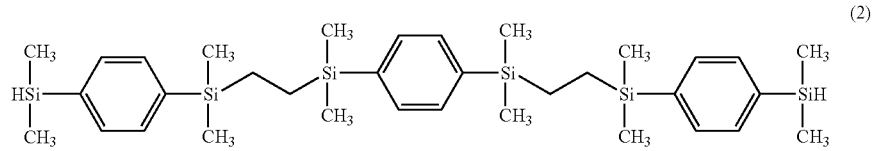

(2)

Synthesis Example 4

Synthesis of Monomer 2

A 5 L separable flask, equipped with a reflux tube and 1 L dropping funnel was charged with 3000 mL of tetrahydrofuran, 5 g of 5 wt % parallium-on-carbon, and 150 g of deionized water, which were heated at 50° C. Then, 587 g of powdery Monomer 1 in Synthesis Example 3 was added in 30 divided portions. After the complete addition of Monomer 1, the solution was aged for 5 hours, and the catalyst was removed by filtration. The filtrate was concentrated into a white solid. The solid was purified by dissolving it in 500 mL of tetrahydrofuran and adding the solution dropwise to 3 L of methanol for reprecipitation. There was obtained 478 g (yield 81%) of Monomer 2 having the formula (3) below.

$^1$H-NMR (400 MHz, CDCl$_3$) δ 7.56 (m, 12H), 1.92 (brs, 2H), 1.04 (t, 8H), 0.43 (s, 36H)

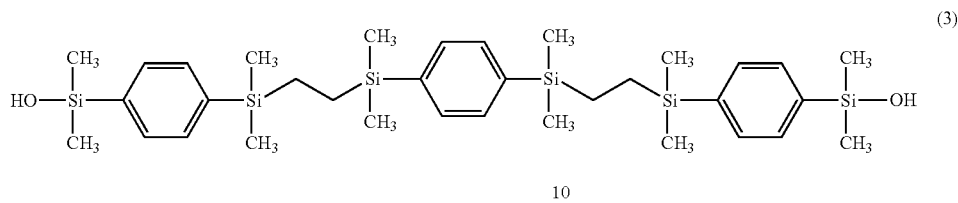

(3)

Next, Synthesis Examples of mesogenic silicon compound (co)polymers or thermoplastic elastomers within the scope of the invention are shown below.

Example 1

Synthesis of Polymer 1

A 500 mL separable flask equipped with a stirrer was charged with 250 g (0.37 mol) of Monomer 2 in Synthesis Example 4 and 10 g (4 wt %) of 1,1,3,3-tetramethylguanidine di-2-ethylhexanoate. Reaction was run at 180° C. for 1 hour and further at 230° C. and 200 Pa for 6 hours. At the end of reaction, the solution was allowed to cool down to room temperature. The resulting polymer was dissolved in 500 mL of tetrahydrofuran, which was added dropwise to 3 L of methanol. There was obtained 190 g of a mesogenic silicon compound (co)polymer having the formula (4) below in white solid form (yield 77%). Mn=40,000, PDI (Mw/Mn)=1.8, m.p.=105° C. This mesogenic silicon compound (co)polymer or thermoplastic elastomer is designated Polymer 1.

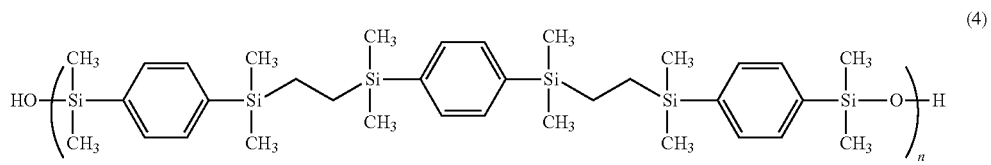

(4)

Herein n is such a number that Mn falls in the range.

Example 2

Synthesis of Polymer 2

A 500 mL separable flask equipped with a stirrer was charged with 200 g (0.3 mol) of Monomer 2 in Synthesis Example 4, 7.5 g (0.033 mol) of 1,4-bis(hydroxydimethylsilyl)benzene in Synthesis Example 1, and 8.3 g (4 wt %) of 1,1,3,3-tetramethylguanidine di-2-ethylhexanoate. Reaction was run at 180° C. for 1 hour and further at 230° C. and 200 Pa for 6 hours. The reaction was followed by spontaneous cooling to room temperature. The resulting polymer was dissolved in 500 mL of tetrahydrofuran, which was added dropwise to 3 L of methanol. There was obtained 167 g of a mesogenic silicon compound (co)polymer having the average molecular formula (5) below in white solid form (yield 80%). Mn=52,000, PDI (Mw/Mn)=2.1, m.p.=115° C. This mesogenic silicon compound (co)polymer or thermoplastic elastomer is designated Polymer 2.

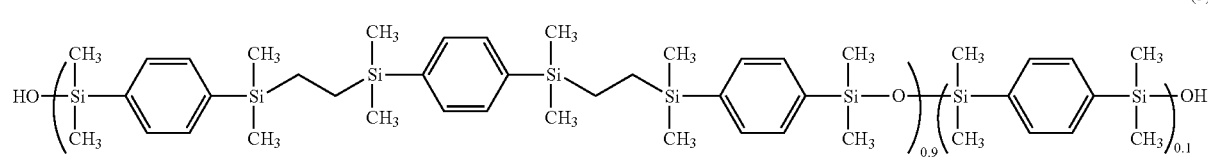

(5)

Example 3

Synthesis of Polymer 3

A 500 mL separable flask equipped with a stirrer was charged with 200 g (0.3 mol) of Monomer 2 in Synthesis Example 4, 22.7 g (0.075 mol) of 4,4'-bis(hydroxydimethylsilyl)biphenyl in Synthesis Example 2, and 8.9 g (4 wt %) of 1,1,3,3-tetramethylguanidine di-2-ethylhexanoate. Reaction was run at 200° C. for 1 hour and further at 250° C. and 200 Pa for 6 hours. The reaction was followed by spontaneous cooling to room temperature. The resulting polymer was dissolved in 500 mL of tetrahydrofuran, which was added dropwise to 3 L of methanol. There was obtained 181 g of a mesogenic silicon compound (co)polymer having the average molecular formula (6) below in white solid form (yield 81/). Mn=36,000, PDI (Mw/Mn)=2.4, m.p.=142° C. This mesogenic silicon compound (co)polymer or thermoplastic elastomer is designated Polymer 3.

[Chem. 14]

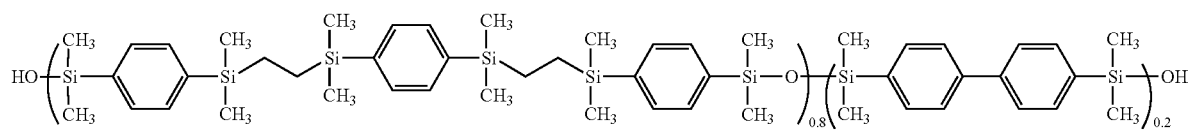

(6)

Example 4

Synthesis of Polymer 4 (Silyl-Terminated Polymer 1)

A 500 ml, separable flask equipped with a stirrer was charged with 10 g of Polymer 1 in Example 1 and 200 mL of tetrahydrofuran, which were stirred at 50° C. for 30 minutes for dissolution. Then 0.1 g (0.83 mmol) of vinyldimethylchlorosilane and 0.13 g (0.83 mmol) of hexamethyldisilazane were added to the solution, which was stirred at 50° C. for a further 1 hour. This was followed by vacuum distillation at 80° C. and 1,000 Pa to remove the excess solvent and silylating agent. There was obtained 9.8 g of a mesogenic silicon compound (co)polymer having the formula (7) below in white solid form (yield 98%). Mn=41,000, PDI (Mw/Mn)=1.8, m.p.=101° C. This mesogenic silicon compound (co)polymer or thermoplastic elastomer is designated Polymer 4.

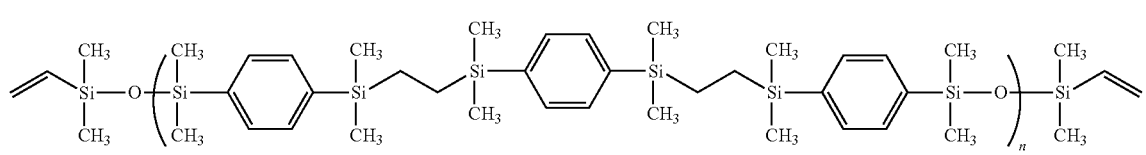

(7)

Herein n is such a number that Mn falls in the range.

Comparative Example 1

Synthesis of Polymer 5

A 1 L recovery flask equipped with a Dean Stark trap was charged with 100 g of 1,4-bis(hydroxydimethylsilyl)benzene in Synthesis Example 1, 800 mL of benzene and 4 g of 1,1,3,3-tetramethylguanidine di-2-ethylhexanoate, which were heated under reflux for 24 hours. Thereafter, purification was performed by adding the solution dropwise to 3 L of methanol for reprecipitation, obtaining 88 g of polytetramethyl-p-silphenylenesiloxane (PTMPS) in white powder form having the following formula (8) (yield 90%). Mn=80.000, PDI (Mw/Mn)=1.7, and m.p.=125° C. This PTMPS is designated Polymer 5.

[Chem. 15]

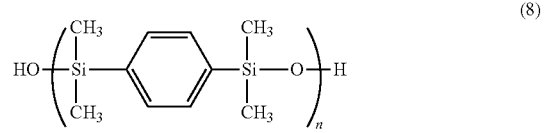

(8)

Herein n is such a number that Mn falls in the range.

Use Example 1

A sheet 1 of Polymer 1 was prepared by weighing 40 g of Polymer 1, melting at 150° C., casting into a mold of 100 mm×100 mm×2 mm, press molding at 150° C. for 10 minutes, and allowing to cool down.

Use Example 2

A sheet 2 of Polymer 2 was prepared by weighing 40 g of Polymer 2, melting at 150° C., casting into a mold of 100 mm×100 mm×2 mm, press molding at 150° C. for 10 minutes, and allowing to cool down.

Use Example 3

A sheet 3 of Polymer 3 was prepared by weighing 40 g of Polymer 3, melting at 150° C., casting into a mold of 100 mm×100 mm×2 nm, press molding at 150° C. for 10 minutes, and allowing to cool down.

Comparative Use Example 1

A sheet 4 of Polymer 5 was prepared by weighing 40 g of Polymer 5, melting at 150° C., casting into a mold of 100 mm×100 mm×2 nm, press molding at 150° C. for 10 minutes, and allowing to cool down.

Comparative Use Example 2

A planetary mixer was charged with 48 g of both end alkenyl-containing silicone oil (dimethylpolysiloxane capped with vinyldimethylsiloxy at both ends) having a viscosity of 1,000 mPa·s and 1.96 g of organohydrogenpolysiloxane containing 4 silicon-bonded hydrogen atoms (SiH groups) per molecule (providing a molar ratio of SiH groups to terminal alkenyl groups of 1:1), which were mixed at room temperature for 30 minutes. Then 0.05 g of 0.5 wt % toluene solution of Karlstedt catalyst was added to the mixture, which was mixed for a further 5 minutes, obtaining an addition curable silicone composition 1. The composition 1 was cast into a mold of 100 mm×100 mm×2 mm and press molded at 150° C. for 10 minutes, obtaining a cured sheet (or silicone sheet) 5 of addition curable silicone composition 1.

Each of the molded sheets of Use Examples 1 to 3 and Comparative Use Examples 1 and 2 was evaluated for physical properties (hardness, tensile strength, elongation). The melting point (m.p.) of Polymers 1 to 3 of Examples 1 to 3, Polymer 5 of Comparative Example 1 and the cured sheet (or silicone sheet) 5 of Comparative Use Example 2 was measured. The results are shown in Table 1 below. For the physical properties, measurement was carried out using an automatic hardness meter and a tensile tester. Notably the conditions for measurement of physical properties are in accord with JIS K6249.

Repetitive molding was examined by cutting each of sheets 1 to 4 molded in Use Examples 1 to 3 and Comparative Use Example 1 and cured sheet 5 molded in Comparative Use Example 2 into a plurality of pieces of about 10 mm×10 mm, collecting the plurality of pieces of about 10 mm×10 mm together, press molding the collection at 150° C. for 10 minutes to form a sheet of 100 mm×100 mm×2 mm again, and performing DSC analysis. The sample is rated OK (○) when the m.p. falls in the range of the m.p. of polymer as synthesized (m.p. measured above)+10° C., and NG (X) otherwise. The outer appearance of the initial molded sheet prior to cutting was visually observed. The results are also shown in Table 1.

TABLE 1

| Results of measurement | Use Example 1 Polymer 1 Sheet 1 | Use Example 2 Polymer 2 Sheet 2 | Use Example 3 Polymer 3 Sheet 3 | Comparative Use Example 1 Polymer 5 Sheet 4 | Comparative Use Example 2 Addition curable silicone composition 1 Cured sheet 5 |
|---|---|---|---|---|---|
| Hardness | A26 | A28 | A34 | D57 | A16 |
| Tensile strength, MPa | 0.9 | 1.1 | 1.5 | 22 | 0.6 |
| Elongation, % | 216 | 183 | 134 | 56 | 132 |
| Melting point, ° C. | 105 | 115 | 142 | 125 | none |
| Repetitive molding | ○ | ○ | ○ | ○ | X |
| Appearance | semi-transparent | semi-transparent | semi-transparent | White (opaque) | transparent |

As is evident from the results, the sheets 1 to 3 molded from Polymers 1 to 3 in Use Examples 1 to 3 have transparency, a hardness in the Type A range, and an elongation of at least 100%, indicating the nature of a rubber elastomer. They also have a melting point of higher than 100° C. and repetitive moldability, proving the formation of a thermoplastic elastomer.

In contrast, the sheet 4 molded from Polymer 5 in Comparative Use Example 1 has a hardness in the Shore D range and a low elongation of less than 100%, indicating physical properties approximate to a common robust thermoplastic resin rather than a rubber elastomer. Also, the cured sheet 5 molded from addition curable silicone composition 1 in Comparative Use Example 2 exhibits physical properties of addition cured silicone rubber elastomer, but does not possess a melting point (does not exhibit thermoplasticity) since it has been cured into rubber by crosslinking reaction.

It is thus demonstrated that the inventive polymer (mesogenic silicon compound (co)polymer) is a thermoplastic elastomer having silicone skeleton and can be advantageously used as heat dissipating materials and sealing materials wherein prior art silicone rubbers are used, contributing to an improvement in productivity by taking advantage of thermoplasticity.

The invention claimed is:

1. A mesogenic silicon compound (co)polymer represented by the general formula (1) and having a number average molecular weight of 1,000 to 500,000,

[Chem. 1]

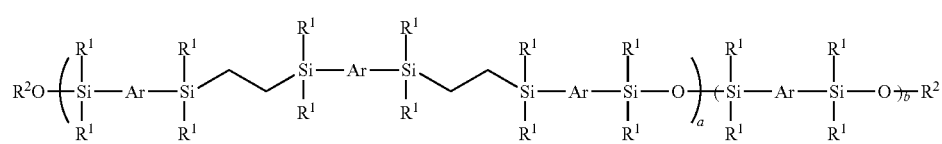

(1)

wherein Ar is a mesogenic group selected from the following structures:

[Chem. 2]

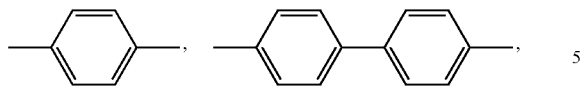

a is a positive number of 0.5 to 1, b is a number of 0 to 0.5, with the proviso that a and b represent a proportion in number of relevant repeating units to the sum of all repeating units in the molecule, respectively, and a+b=1, a repetition number or degree of polymerization (designated a') of silarylene-silalkylenesiloxane units [—Si($R^1$)$_2$—Ar—Si($R^1$)$_2$—C$_2$H$_4$—Si($R^1$)$_2$—Ar—Si($R^1$)$_2$—C$_2$H$_4$—Si($R^1$)$_2$—Ar—Si($R^1$)$_2$—O—] in the main chain is an integer of the order of 5 to 1,000, a repetition number or degree of polymerization (designated b') of silarylenesiloxane units [—Si($R^1$)$_2$—Ar—Si($R^1$)$_2$—O—] in the main chain is an integer of the order of 0 to 100, and the total number of repeating units or degree of polymerization (designated a'+b') of the overall main chain is an integer of the order of 10 to 1,000, $R^1$ is independently a $C_1$-$C_8$ monovalent hydrocarbon group free of aliphatic unsaturation, and $R^2$ is independently hydrogen, —Si(CH$_3$)$_3$, —Si(CH$_3$)$_2$(OH), —Si(CH$_3$)$_2$(CH=CH$_2$) or —Si(CH$_3$)$_2$(CH$_2$—CH=CH$_2$).

2. A thermoplastic elastomer comprising the mesogenic silicon compound (co)polymer of claim 1, having a melting point of 50 to 250° C., and being repeatedly moldable.

* * * * *